(12) United States Patent
Kanda

(10) Patent No.: US 8,224,385 B2
(45) Date of Patent: Jul. 17, 2012

(54) WIRELESS BASE STATION AND CONTROL METHOD THEREOF

(75) Inventor: Takashi Kanda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 12/718,502

(22) Filed: Mar. 5, 2010

(65) Prior Publication Data

US 2010/0157949 A1 Jun. 24, 2010

Related U.S. Application Data

(63) Continuation of application No. PCT/JP2007/067667, filed on Sep. 11, 2007.

(51) Int. Cl.
*H04W 4/00* (2009.01)
*H04M 1/00* (2006.01)
*H04J 3/00* (2006.01)
*H04B 7/216* (2006.01)
*H04B 10/00* (2006.01)

(52) U.S. Cl. ............ 455/561; 455/422.1; 370/280; 370/332; 370/342; 398/115; 398/167.5

(58) Field of Classification Search .......... 455/562.1, 455/132–135, 69, 513, 522, 272, 277.1, 277, 455/574, 561; 370/332, 334
See application file for complete search history.

(56) References Cited

U.S. PATENT DOCUMENTS

| | | | | |
|---|---|---|---|---|
| 5,669,060 A | * | 9/1997 | Guimont | 455/436 |
| 5,678,186 A | * | 10/1997 | Lee | 455/437 |
| 5,732,351 A | * | 3/1998 | Olds et al. | 455/436 |
| 5,890,067 A | * | 3/1999 | Chang et al. | 455/446 |
| 5,918,164 A | * | 6/1999 | Takahashi et al. | 455/134 |
| RE36,591 E | * | 2/2000 | Hayashi et al. | 370/342 |
| 6,052,605 A | * | 4/2000 | Meredith et al. | 455/561 |
| 6,243,563 B1 | * | 6/2001 | Nakamura | 455/78 |
| 6,385,464 B1 | * | 5/2002 | Narita et al. | 455/561 |
| 6,408,169 B1 | * | 6/2002 | Pallonen | 455/277.2 |
| 6,434,406 B2 | * | 8/2002 | Lee | 455/562.1 |
| 6,545,455 B2 | * | 4/2003 | Saito | 324/76.26 |
| 6,594,475 B1 | * | 7/2003 | Anvekar et al. | 455/277.1 |

(Continued)

FOREIGN PATENT DOCUMENTS

| | | |
|---|---|---|
| JP | 62082732 | 4/1987 |

(Continued)

OTHER PUBLICATIONS

Japanese Office Action dated Jul. 12, 2011 for application No. 2009-531996.

(Continued)

*Primary Examiner* — Dwayne Bost
*Assistant Examiner* — Scott Trandai
(74) *Attorney, Agent, or Firm* — Murphy & King, P.C.

(57) ABSTRACT

For processing an uplink signal from a mobile station without desiring a high AFC capability in any state, in a wireless base station including a plurality of antennas, reception signals from a mobile station are taken in to perform a signal transmission and reception with the mobile station by a first antenna providing a higher reception signal level, in which a switchover from a signal transmission to the mobile station by the first antenna to that by a second antenna is performed when a frequency variation characteristic measured for an allocated frequency of the reception signal from the first antenna indicates that the mobile station is moving away from the first antenna.

7 Claims, 13 Drawing Sheets

U.S. PATENT DOCUMENTS

| | | | | |
|---|---|---|---|---|
| 7,058,418 | B2* | 6/2006 | Doi et al. | 455/500 |
| 7,107,021 | B2* | 9/2006 | Kim et al. | 455/101 |
| 7,155,229 | B2* | 12/2006 | Dent | 455/450 |
| 7,274,727 | B2* | 9/2007 | Nakayama | 375/148 |
| 7,359,362 | B2* | 4/2008 | King et al. | 370/338 |
| 7,486,931 | B2* | 2/2009 | Cho et al. | 455/39 |
| 7,555,063 | B2* | 6/2009 | Sadahiro | 375/316 |
| 7,761,116 | B2* | 7/2010 | Doi et al. | 455/562.1 |
| 7,885,619 | B2* | 2/2011 | Cheng et al. | 455/101 |
| 7,912,120 | B2* | 3/2011 | Pietraski et al. | 375/232 |
| 7,953,372 | B2* | 5/2011 | Ofek et al. | 455/63.4 |
| 8,019,352 | B2* | 9/2011 | Rappaport et al. | 455/456.1 |
| 2001/0043061 | A1* | 11/2001 | Saito | 324/76.26 |
| 2001/0046205 | A1* | 11/2001 | Easton et al. | 370/209 |
| 2003/0096638 | A1* | 5/2003 | Doi et al. | 455/562 |
| 2003/0129984 | A1* | 7/2003 | Dent | 455/446 |
| 2004/0242277 | A1* | 12/2004 | Kiribayashi | 455/562.1 |
| 2006/0019679 | A1* | 1/2006 | Rappaport et al. | 455/456.5 |
| 2006/0067445 | A1* | 3/2006 | Sadahiro | 375/347 |
| 2006/0171357 | A1* | 8/2006 | King et al. | 370/331 |
| 2007/0184841 | A1* | 8/2007 | Choi et al. | 455/444 |
| 2007/0189261 | A1* | 8/2007 | Choi et al. | 370/347 |
| 2007/0224953 | A1* | 9/2007 | Nakagawa et al. | 455/140 |
| 2007/0254717 | A1* | 11/2007 | Yahagi | 455/562.1 |
| 2008/0089269 | A1* | 4/2008 | Tsutsui | 370/316 |
| 2008/0132173 | A1* | 6/2008 | Sung et al. | 455/67.13 |
| 2008/0259893 | A1* | 10/2008 | Murata et al. | 370/342 |
| 2009/0061940 | A1* | 3/2009 | Scheinert et al. | 455/562.1 |
| 2009/0137237 | A1 | 5/2009 | Nakashima et al. | |
| 2009/0239523 | A1* | 9/2009 | Miyamoto | 455/422.1 |
| 2010/0298005 | A1* | 11/2010 | Yavuz et al. | 455/452.2 |
| 2010/0317350 | A1* | 12/2010 | Lee et al. | 455/442 |
| 2011/0019562 | A1* | 1/2011 | Cattuto et al. | 370/252 |
| 2011/0103273 | A1* | 5/2011 | Dutta | 370/281 |
| 2011/0150066 | A1* | 6/2011 | Fujimoto | 375/224 |
| 2011/0176420 | A1* | 7/2011 | Shiotsuki et al. | 370/235 |
| 2011/0195682 | A1* | 8/2011 | Ruckriem | 455/140 |

FOREIGN PATENT DOCUMENTS

| | | |
|---|---|---|
| JP | 2004015518 | 1/2004 |
| JP | 2005295282 | 10/2005 |
| WO | 2007034700 | 3/2007 |

OTHER PUBLICATIONS

"NTT DoCoMo, Inc press release" http://www.nttdocomo.co.jp/info/news_release/page/20030919.html dated Sep. 19, 2003.

International Search Report dated Nov. 13, 2007, from the corresponding International Application No. PCT/JP2007/067667.

* cited by examiner

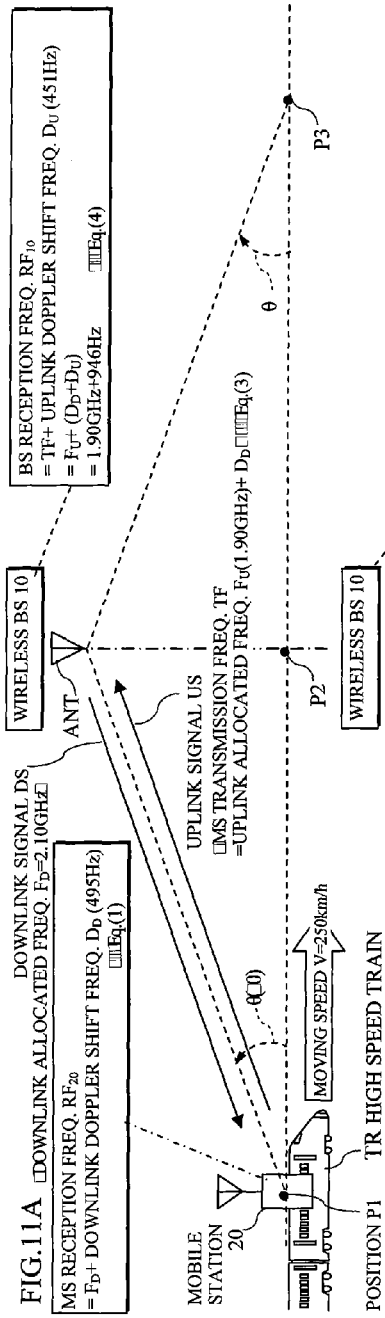
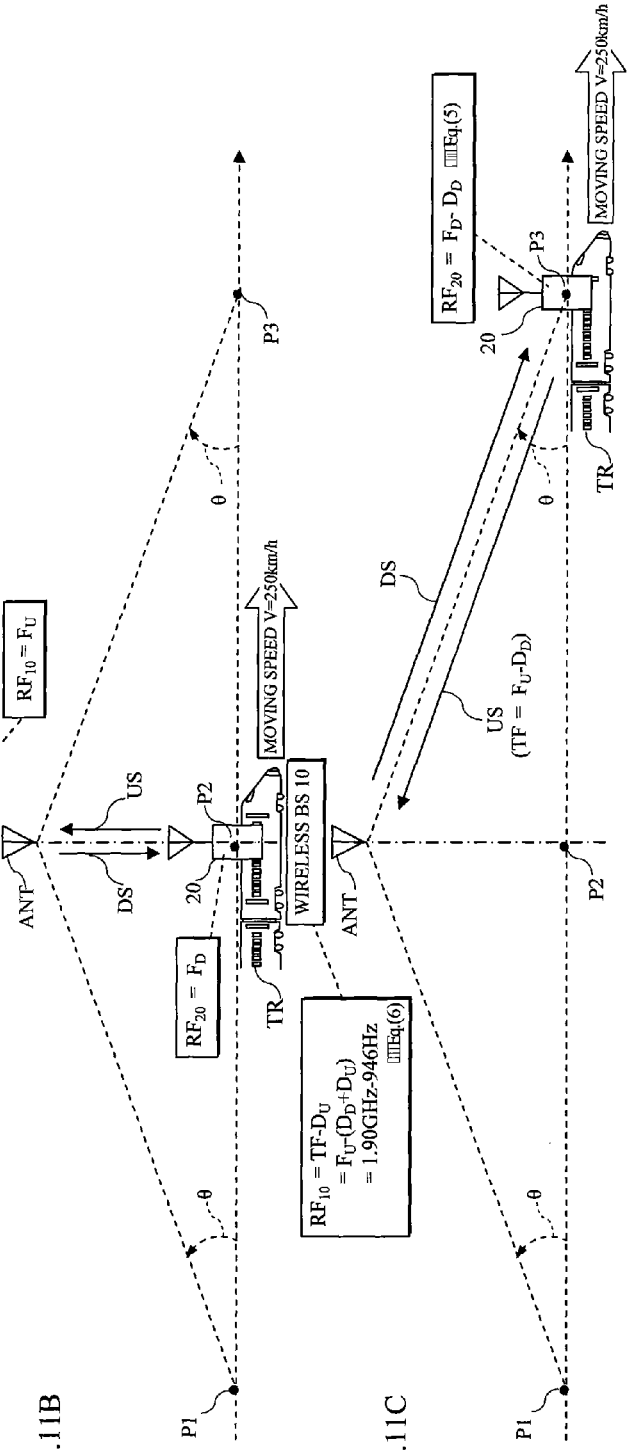
FIG.11A
FIG.11B
FIG.11C

WIRELESS BASE STATION AND CONTROL METHOD THEREOF

CROSS-REFERENCE TO RELATED APPLICATION

This application is a continuation of International Application PCT/JP2007/67667 filed on Sep. 11, 2007, the contents of which are herein wholly incorporated by reference.

FIELD

The present invention relates to a wireless (radio) base station and a control method thereof, for performing communications with a mobile station in a mobile communication system.

BACKGROUND

FIG. 10 depicts an arrangement of a wireless base station in a mobile communication system as a related art.

This wireless base (BS) station 10 is schematically composed of a transmitting/receiving portion 100 connected to an antenna ANT, a baseband signal processor 200 performing a baseband signal processing to a signal transmitted/received or transferred between a mobile station (MS) 20 and the wireless base station 10, and a communication network interface (IF) 300 serving as an interface with a mobile communication network NW.

In such a mobile communication system, due to a Doppler effect caused by a movement of the mobile station 20, the wireless base station 10 has a frequency shift (variation) arisen in an uplink signal received from the mobile station 20.

Therefore, the baseband signal processor 200 within the wireless base station 10 is provided with an AFC (Automatic Frequency Control) function for automatically controlling the frequency of an uplink signal received in accordance with a specified allocation frequency (see e.g. Japanese Laid-open Patent Publication No. 2005-295282).

In the above related art, the wireless base station provided in such a place that a mobile station moves at a high speed is desired to have a high AFC capability of dealing with a large frequency variation, which causes a problem that the circuit scale within the wireless base station is to be increased.

Hereinafter, the above problem will be described by taking as an example a case where the mobile station 20 moves through positions P1 to P2 to P3 while passing through the wireless base station 10 as depicted in FIGS. 11A-11C, where it is supposed that a user (not depicted) holding the mobile station 20 boards a high speed train TR moving at a speed of V="250 Km/h".

As depicted in FIG. 11A, the mobile station 20 receives a downlink signal DS, where an allocated frequency $F_D$="2.10 GHz", transmitted from the wireless base station 10 at the position P1. Now supposing that the position P1 be sufficiently distant from the antenna ANT of the wireless base station 10 so that an angle θ, formed between the travelling direction of the mobile station 20 and the arrival direction of the downlink signal DS, is almost zero (θ "0"), a reception frequency (hereinafter, mobile station reception frequency) $RF_{20}$ of the downlink signal DS in the mobile station 20 assumes a value given by the following Eq. (1):

MS reception freq. $RF_{20}$=downlink allocated freq.
$F_D$(2.10 GHz)+downlink Doppler shift freq.
$D_D$(495 Hz)    Eq. (1)

It is to be noted that the downlink Doppler shift frequency $D_D$="495 Hz" in the above Eq. (1) is calculated according to the following Eq. (2), where an uplink Doppler shift frequency as will be described below is similarly calculated by Eq. (2):

Down link Doppler shift freq. $D_D$=moving speed
$V$*downlink allocated freq. $F_D$/light speed $C$    Eq. (2)

Then, the mobile station 20 transmits to the wireless base station 10 to the wireless base station 10 an uplink signal US, where allocated frequency $F_U$="1.90 GHz", at a transmission frequency TF given by the following Eq. (3):

MS transmission freq. TF=uplink allocated freq.
$F_U$(1.90 GHz)+downlink Doppler shift freq. $D_D$    Eq. (3)

Namely, for producing the transmission frequency TF in synchronization with the reception frequency $RF_{20}$, the mobile station 20 transfers the downlink Doppler shift frequency $D_D$ to the uplink signal US without changes. Accordingly, the reception frequency (hereinafter, occasionally BS reception frequency) $RF_{10}$ of the uplink signal US in the wireless base station 10 is then to assume a value given by the following Eq. (4) under the influence of the uplink Doppler shift frequency Du (451 Hz):

$$BS \text{ reception } freq. \ RF_{10} = MS \text{ transmission } freq. \ TF +$$
$$\text{uplink Doppler shift } freq.$$
$$D_U \ (451 \text{ Hz})$$
$$= F_U + (D_D + D_U)$$
$$= 1.90 \text{ GHz} + 946 \text{ Hz}$$

Eq. (4)

Namely, in the uplink signal US received by the wireless base station 10, both of the downlink Doppler shift frequency $D_D$ and the uplink Doppler shift frequency Du appear as a frequency variation.

Then, as the mobile station 20 approaches the antenna ANT of the wireless base station 10, frequency variation ranges of the base station reception frequency $RF_{10}$ and the MS reception frequency $RF_{20}$ present characteristics decreasing from "946 Hz" and "495 Hz" respectively as depicted by characters $CR_{10}$ and $CR20$ in FIG. 12. This is because as the above angle θ increases, the BS direction component (V cos θ) of the moving speed V of the mobile station 20 decreases so that the downlink Doppler shift frequency $D_D$ and the uplink Doppler shift frequency Du both decrease.

When the mobile station 20 arrives at the position P2 as depicted in FIG. 11B, the BS direction component of the speed V assumes "0", so that no Doppler shift is caused in the downlink signal DS and the uplink signal US, whereby the BS reception frequency $RF_{10}$ and the MS reception frequency $RF_{20}$ become equal to the uplink allocated frequency Fu and the downlink allocated frequency $F_D$, respectively.

As the mobile station 20 moves away from the antenna ANT, the BS reception frequency variation characteristic $CR_{10}$ and the MS reception frequency variation characteristic $CR_{20}$ present negative characteristics further decreasing from "0 Hz" as depicted in FIG. 12. Namely, when the mobile station 20 moves away from the wireless base station 10, a negative Doppler shift is caused in both of the uplink and downlink directions.

When the mobile station 20 arrives at the position P3 as depicted in FIG. 11C, the MS reception frequency $RF_{20}$ and the BS reception frequency $RF_{10}$ assume respective values given by the following Eqs. (5) and (6), where it is supposed that the position P3 be sufficiently distant from the antenna ANT like the position P1, i.e. the above angle θ "0" is established:

MS reception freq. $RF_{20}$=downlink allocated freq. $F_D$ downlink Doppler shift freq. $D_D$   Eq. (5)

$$\begin{aligned} BS \text{ reception freq. } RF_{10} &= MS \text{ transmission freq. } TF \\ &\quad \text{uplink Doppler shift freq.} \\ &\quad D_U \\ &= F_U(D_D + D_U) \\ &= 1.90 \text{ GHz } 946 \text{ Hz} \end{aligned}$$   Eq. (6)

Namely, when being set under the condition depicted in FIGS. 11A-11C, the wireless base station 10 is desired to have a very high AFC capability of dealing with a frequency variation range of "946 Hz" to "+946 Hz". Also, as the moving speed V of the mobile station 20 is increased, the influence of the Doppler shift is increased, so that the wireless base station 10 is desired to have an AFC capability of dealing therewith.

If the AFC capability of the wireless base station 10 is low, a problem depicted in FIGS. 13A-13C will arise, where it is supposed that the wireless base station 10 manage two sectors SCT1 and SCT2 as depicted in FIG. 13A and the mobile station 20 perform a transmission/reception of the downlink signal DS and the uplink signal US with the sector SCT1.

In this state, when the mobile station 20 moves away from the sector SCT1 as depicted in FIG. 13B, it becomes possible to perform a transmission/reception with the sector SCT2, so that the mobile station 20 transmits to the sector SCT1 a switchover request REQ toward the sector SCT2 (or additional request to the sector SCT2).

However, if the AFC capability of the wireless base station 10 is low, the sector switchover request REQ is not normally processed or received, so that when the mobile station 20 moves further away from the sector SCT1 as depicted in FIG. 13C, the mobile station 20 may not perform a transmission/reception in any of the sectors SCT1 and SCT2, causing a communication disconnection.

SUMMARY

[1] According to an aspect of the invention, a wireless base station includes: a plurality of antennas; and a signal processor to take in reception signals from a mobile station to perform a signal transmission and reception with the mobile station by a first antenna providing a higher reception signal level, in which the signal processor switches over the signal transmission to the mobile station by the first antenna to that by a second antenna when a frequency variation characteristic measured for an allocated frequency of the reception signal from the first antenna indicates that the mobile station is moving away from the first antenna.

In this case, the mobile station moving toward the second antenna, so that a positive Doppler shift arises in the downlink signal. On the other hand, a negative Doppler shift arises in the uplink signal.

[2] In the above [1], the above signal processor may determine that the mobile station is moving away from the first antenna when the frequency variation characteristic presents a negative characteristic and a variation range of the frequency variation characteristic exceeds a specified value.

[3] In the above [1], after having switched over the signal transmission to the mobile station by the first antenna to that by the second antenna, when a variation range of the frequency variation characteristic measured with the second antenna falls below a specified value, the signal processor may determine that the mobile station has moved within a fixed distance area of the second antenna, thereby switching over the signal reception from the mobile station by the first antenna to that by the second antenna as well.

[4] In the above [3], the antennas and the signal processor may be provided for each sector managed by the wireless base station, in which the adjacent antennas on adjacent sectors are set close to each other to present equivalent frequency variation characteristics.

[5] According to another aspect of the invention, a wireless base station system includes a plurality of slave base stations; and a master base station to take in reception signals of the slave base stations from a mobile station to select a first slave base station providing a higher reception signal level to perform a signal transmission and reception with the mobile station, in which the master base station selects a second slave base station to perform a signal transmission to the mobile station when a frequency variation characteristic measured for an allocated frequency of the reception signal for the first slave base station indicates that the mobile station is moving away from the first slave base station.

[6] According to still another aspect of the invention, a wireless base station system includes a plurality of wireless base stations, each of which further includes: a plurality of antennas; and a signal processor to take in reception signals from a mobile station to perform a signal transmission and reception with the mobile station by a first antenna providing a higher reception signal level, in which the signal processor switches over the signal transmission to the mobile station by the first antenna to that by a second antenna when a frequency variation characteristic measured for an allocated frequency of the reception signal from the first antenna indicates that the mobile station is moving away from the first antenna; and after the signal transmission to the mobile station by the first antenna has been switched over to that by the second antenna, when a variation range of the frequency variation characteristic measured with the second antenna falls below a specified value, the signal processor determines that the mobile station has moved within a fixed distance area of the second antenna, thereby switching over the signal reception from the mobile station by the first antenna to that by the second antenna as well; the adjacent antennas on adjacent wireless base stations being set close to each other to present equivalent frequency variation characteristics.

[7] According to still another aspect of the invention, a control method of a wireless base station having a plurality of antennas includes: taking in reception signals from a mobile station to perform a signal transmission and reception with the mobile station by a first antenna providing a higher reception signal level; measuring, during the signal transmission and reception, a frequency variation characteristic for an allocated frequency of the reception signal from the first antenna; and switching over the signal transmission to the mobile station by the first antenna to that by a second antenna when the frequency variation characteristic indicates that the mobile station is moving away from the first antenna.

The object and advantages of the embodiment will be realized and attained by means of the elements and combinations particularly pointed out in the claims.

BRIEF DESCRIPTION OF THE DRAWINGS

FIGS. 11A-11C are diagrams depicting a mobile station transmission frequency and a base station reception frequency in a wireless base station;

DESCRIPTION OF EMBODIMENTS

Embodiments [1] and [2] of a wireless base station and a control method thereof according to the present invention will be hereinafter described referring to FIGS. 1-9.

Embodiment [1]: FIGS. 1-7

Figure 1:
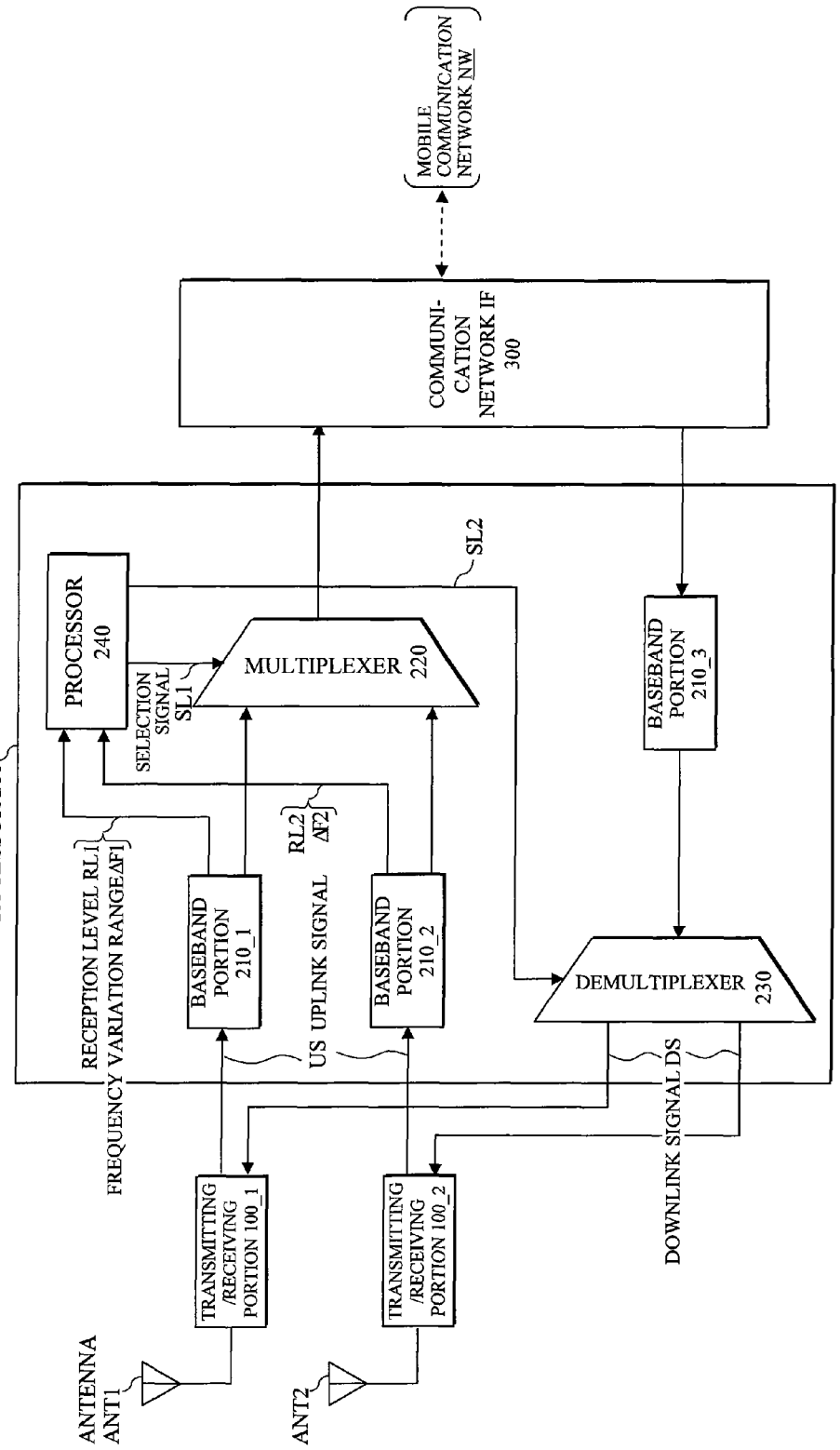
FIG. 1 is a block diagram depicting an arrangement of an embodiment [1] of a wireless base station and a control method thereof.

Arrangement: FIG. 1

Figure 10:
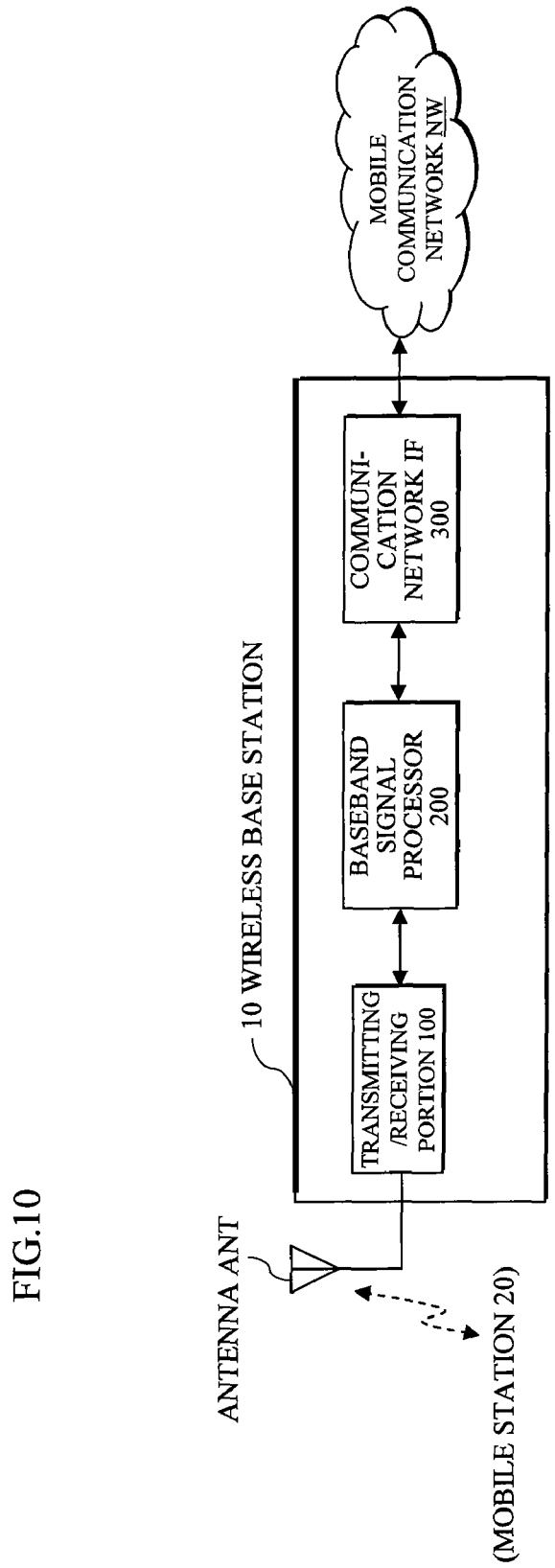
FIG. 10 is a block diagram depicting a general arrangement of a wireless base station.

A wireless base station 10 according to this embodiment depicted in FIG. 1 is provided with two antennas ANT1 and ANT2, different from the related art arrangement depicted in FIG. 10, in which transmitting/receiving portions 100_1 and 100_2 are provided corresponding to the antennas ANT1 and ANT2.

A baseband signal processor 200 is formed of baseband portions 210-1 and 210-2 for executing baseband signal processing which respectively convert high frequency uplink signals US outputted from the transmitting/receiving portions 100_1 and 100_2 into baseband signals and measure reception levels RL1 and RL2 (hereinafter, occasionally represented by reference numeral RL) as well as frequency variation ranges $\Delta F1$ and $\Delta F2$ (hereinafter, occasionally represented by reference numeral $\Delta F$) of the uplink signals US; a baseband portion 210_3 for executing a baseband signal processing which converts a downlink signal DS received from a mobile communication network NW through a communication network interface (IF) 300 into a baseband signal; a multiplexer 220 which selects either one of the uplink signals US outputted from the baseband portions 210_1 and 210_2 in accordance with a selection signal SL1; a demultiplexer 230 which provides a downlink signal DS outputted from the baseband portion 210_3 to either one of the transmitting/receiving portions 100_1 and 100_2 in accordance with a selection signal SL2; and a processor 240 which generates the selection signals SL1 and SL2 based on the reception level RL and the frequency variation range $\Delta F$.

It is to be noted that while the wireless base station 10 in FIG. 1 is arranged to use two antennas, an arrangement using a plurality of antennas can be similarly applied, where the above mentioned first antenna is single and the second antenna (adjacent base station) is selected among from the other antennas.

Operation Example: FIGS. 2-6

Figure 2:
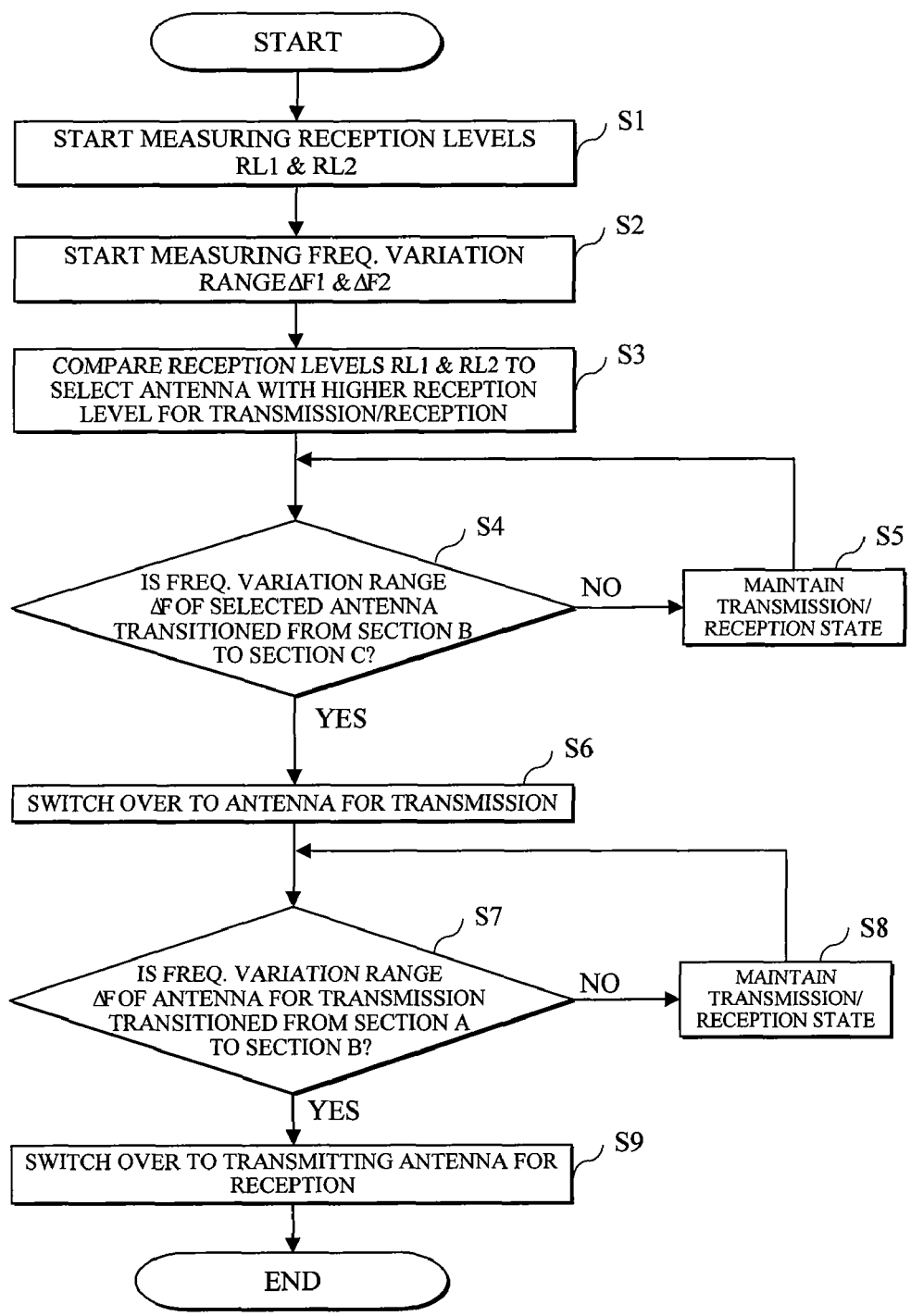
FIG. 2 is a flow chart depicting an operation example of an embodiment [1] of a wireless base station and a control method thereof.

As depicted in FIG. 2, in the initial communication state with a mobile station, the baseband portions 210_1 and 210_2 within the baseband signal processor 200 start to measure the reception levels RL1 and RL2 of the uplink signals US received from the antennas ANT1 and ANT2 through the transmitting/receiving portions 100_1 and 100_2 (step S1).

Then, the baseband portions 210_1 and 210_2 start to measure the frequency variation ranges $\Delta F1$ and $\Delta F2$ of the uplink signals US (step S2).

The processor 240 having received the reception levels RL1 and RL2 respectively measured by the baseband portions 210_1 and 210_2 compares the reception levels RL1 and RL2 and provides as an output the selection signal SL1 for instructing the selection of the uplink signal US outputted from the baseband portion of which reception level is higher (i.e. uplink signal US received from the antenna of which reception level is higher) to the multiplexer 220. Together with this, the processor 240 provides the selection signal SL2 for instructing to provide the downlink signal DS outputted from the baseband portion 210_3 to the transmitting/receiving portion 100_1 or 100_2 having the antenna of which reception level is higher to the demultiplexer 230 (step S3).

Figure 3A:
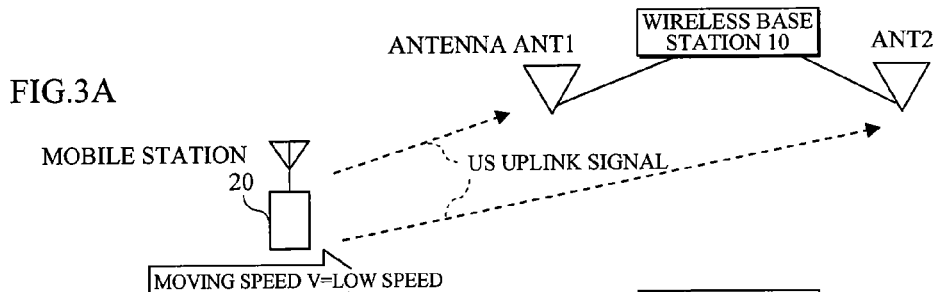
FIGS. 3A-3E are diagrams depicting one example of a moving process of a mobile station used in an operation of an embodiment [1] of a wireless base station and a control method thereof.

Taking as an example a case (initial state) as depicted in FIG. 3A where the mobile station 20 moves at a low speed from the side of the antenna ANT1 toward the wireless base station 10, "reception level RL1 reception level RL2" is established since the antenna ANT1 is closer than the antenna ANT2.

Figure 3B:
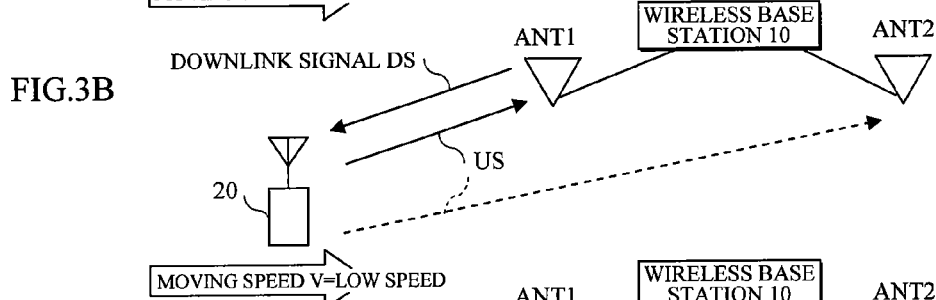

Therefore, as depicted by solid lines in FIG. 3B, the transmission of the downlink signal DS and the reception of the uplink signal US are to be made by the antenna ANT1, while the reception itself of the uplink signal US by the antenna ANT2 is not stopped and the frequency variation range $\Delta F2$ is continuously measured.

Figure 4:
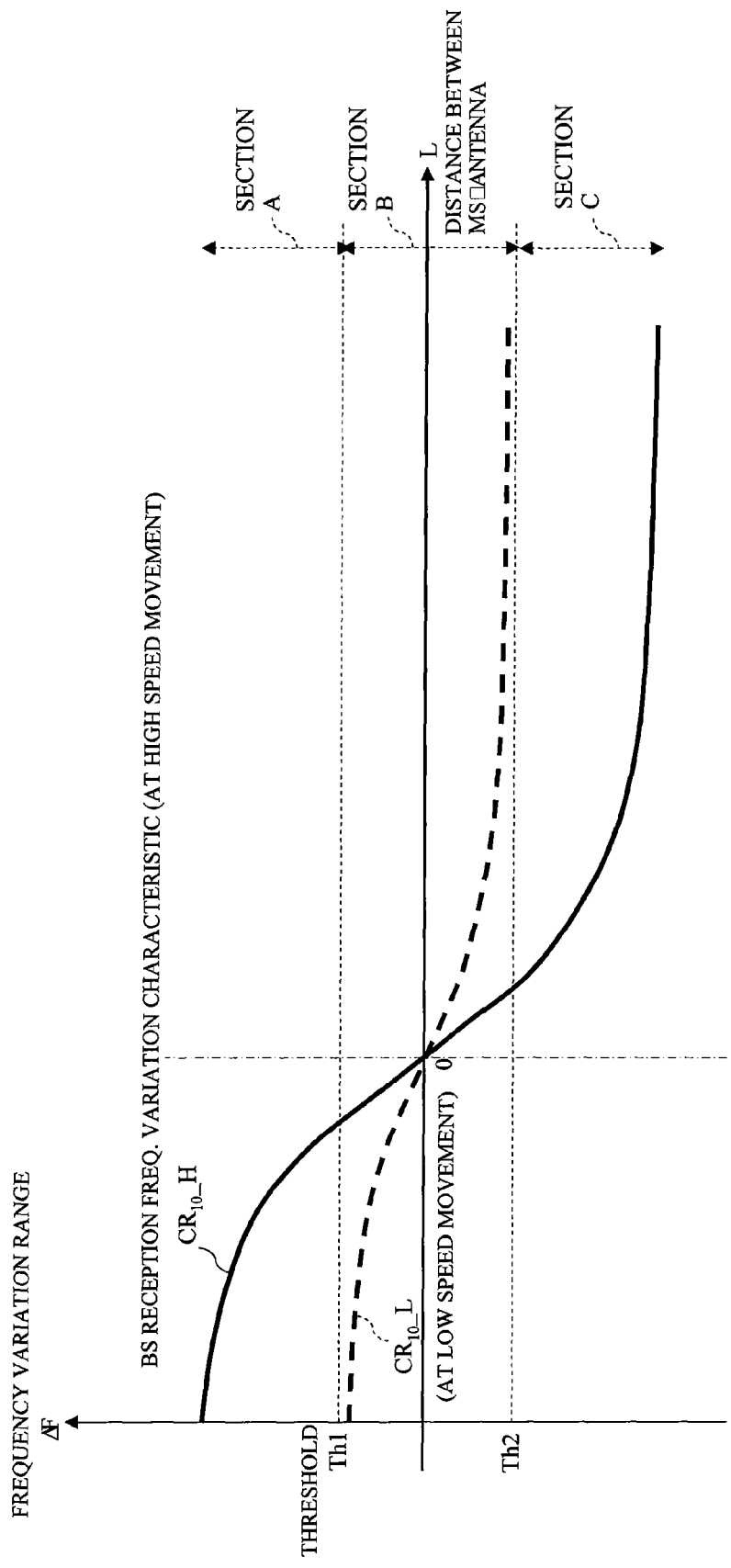
FIG. 4 is a graph depicting a base station reception frequency variation characteristic used in an embodiment [1] of a wireless base station and a control method thereof.

Now, the moving speed V of the mobile station 20 is low and the downlink Doppler shift frequency arising in the downlink signal DS and the uplink Doppler shift frequency arising in the uplink signal US are both low, so that as depicted by a characteristic $CR_{10\_L}$ of dotted lines in FIG. 4, the frequency variation of the base station reception frequency is in a small state (section B).

It is to be noted that a case where the moving speed V of the mobile station from the initial state is high will be described later in the embodiment [2].

"Section A" to "Section C" are now defined by using preset threshold values Th1 and Th2 with respect to the frequency variation range ΔF as depicted in FIG. 4 in the following:
"Section A": frequency variation range ΔF threshold value Th1;
"Section B": threshold value Th1 frequency variation range ΔF threshold value Th2;
"Section C": frequency variation range ΔF threshold value Th2; where the above threshold values Th1 and Th2 may be set as appropriate depending on the wireless base station's AFC capability.

Figure 12:
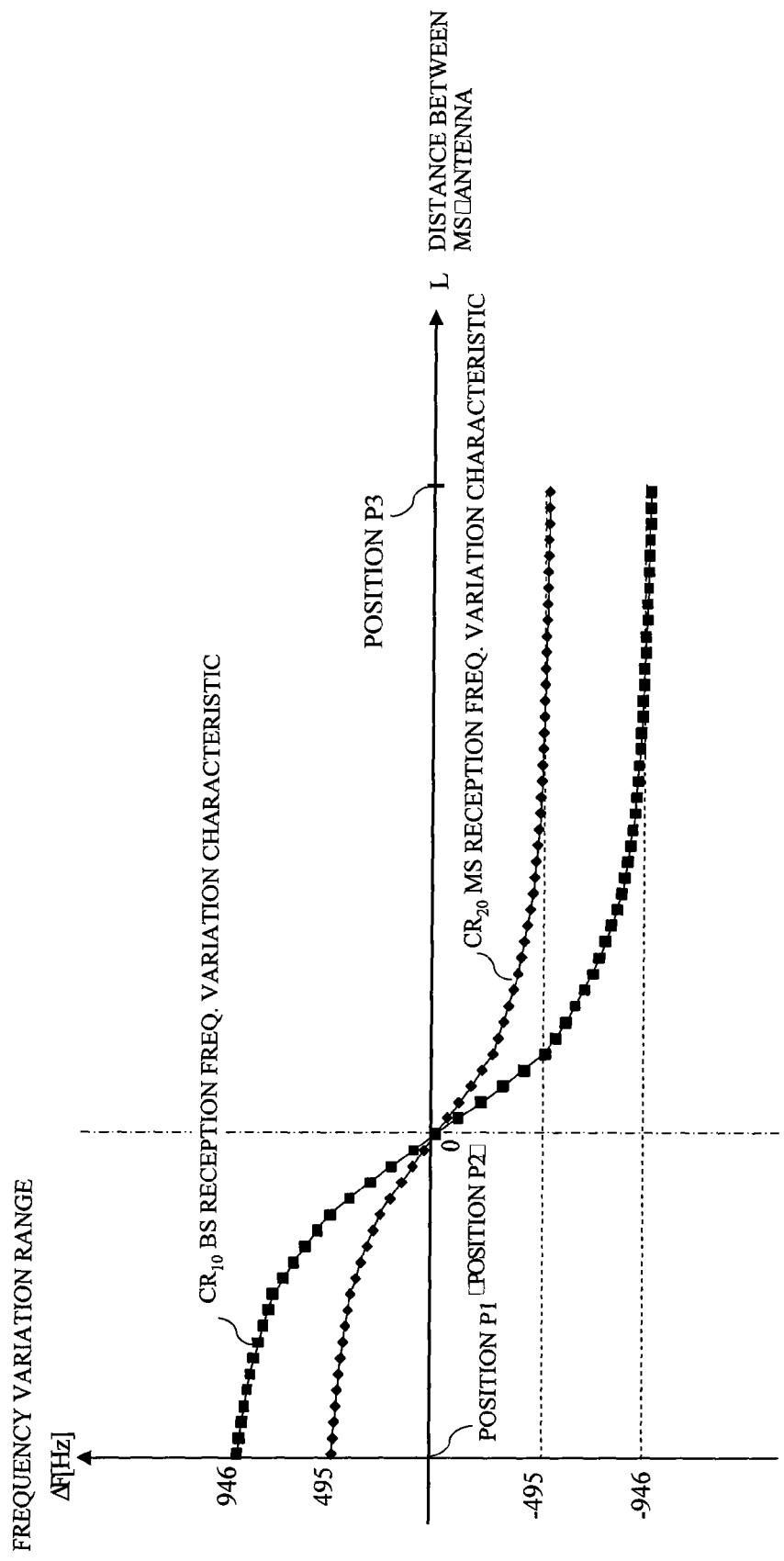
FIG. 12 is a graph depicting a base station reception frequency variation characteristic in a wireless base station.
Figures 13A, 13B, 13C:
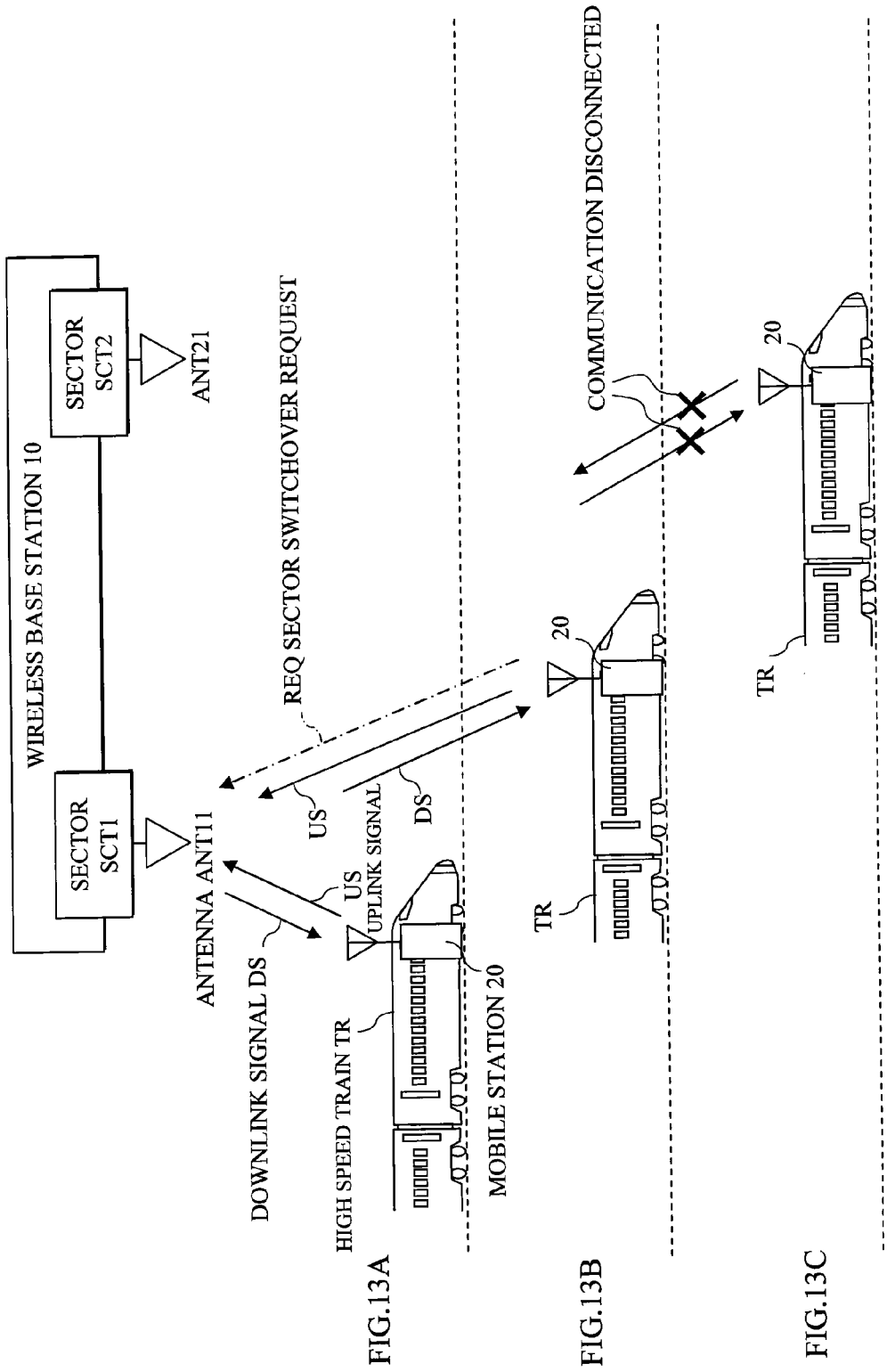
FIGS. 13A-13C are diagrams depicting a switchover operation between sectors in a wireless base station.

When the moving speed V of the mobile station 20 is high, the frequency variation range ΔF presents a large characteristic $CR_{10\_H}$ of a solid line in comparison with the characteristic $CR_{10\_L}$ at the low speed in the same manner as the characteristic depicted in FIG. 12.

Subsequently, the processor 240 monitors whether or not the frequency variation range ΔF1 of the uplink signal US received from the antenna ANT1 selected has transitioned from "section B" to "section C" depicted in FIG. 4 (step S4).

Figure 3C:
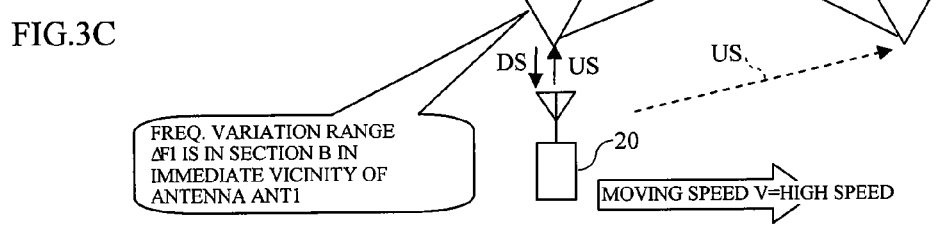

For example, when the mobile station 20 moves from the position of FIG. 3B while being accelerated and reaches an immediate vicinity of the antenna ANT1 as depicted in FIG. 3C under the condition where the speed V="high speed" is established, at which the frequency variation range ΔF1 of the antenna ANT1 resides in "section B", the processor 240 executes no signal processing, thereby maintaining the transmission reception state by the antenna ANT1 (step S5).

Figure 3D:
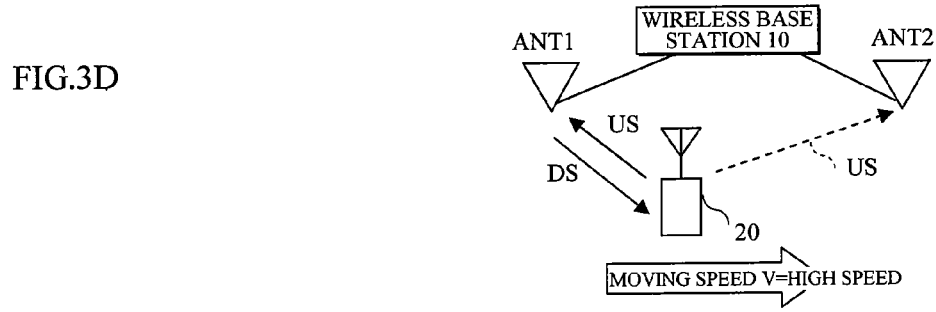

On the other hand, when the mobile station 20 moves away from the antenna ANT as depicted in FIG. 3D, the frequency variation range ΔF1 of the antenna ANT1 transitions to "section C", so that the processor 240 provides the selection signal SL2 instructing to provide the downlink signal DS to the antenna ANT2 (transmitting/receiving portion 100_2), not the antenna ANT1 (transmitting/receiving portion 100_1) to the demultiplexer 230 (step S6).

Figure 3E:
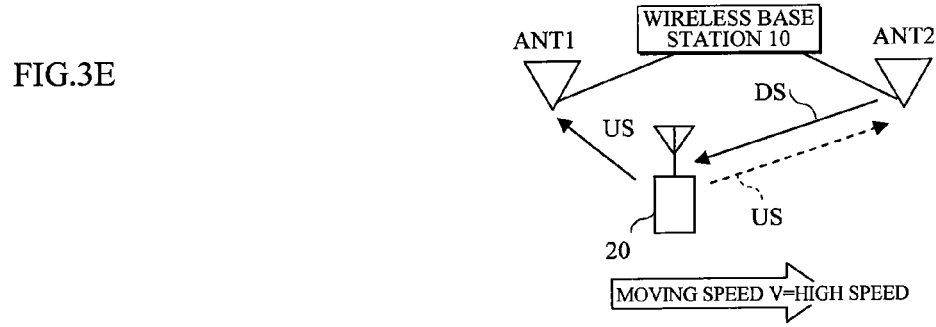

This makes, as depicted in FIG. 3E, the wireless base station 10 transmit the downlink signal DS to the mobile station 20 through the antenna ANT2 and receive the uplink signal US from the mobile station 20 through the antenna ANT1.

Figure 5:
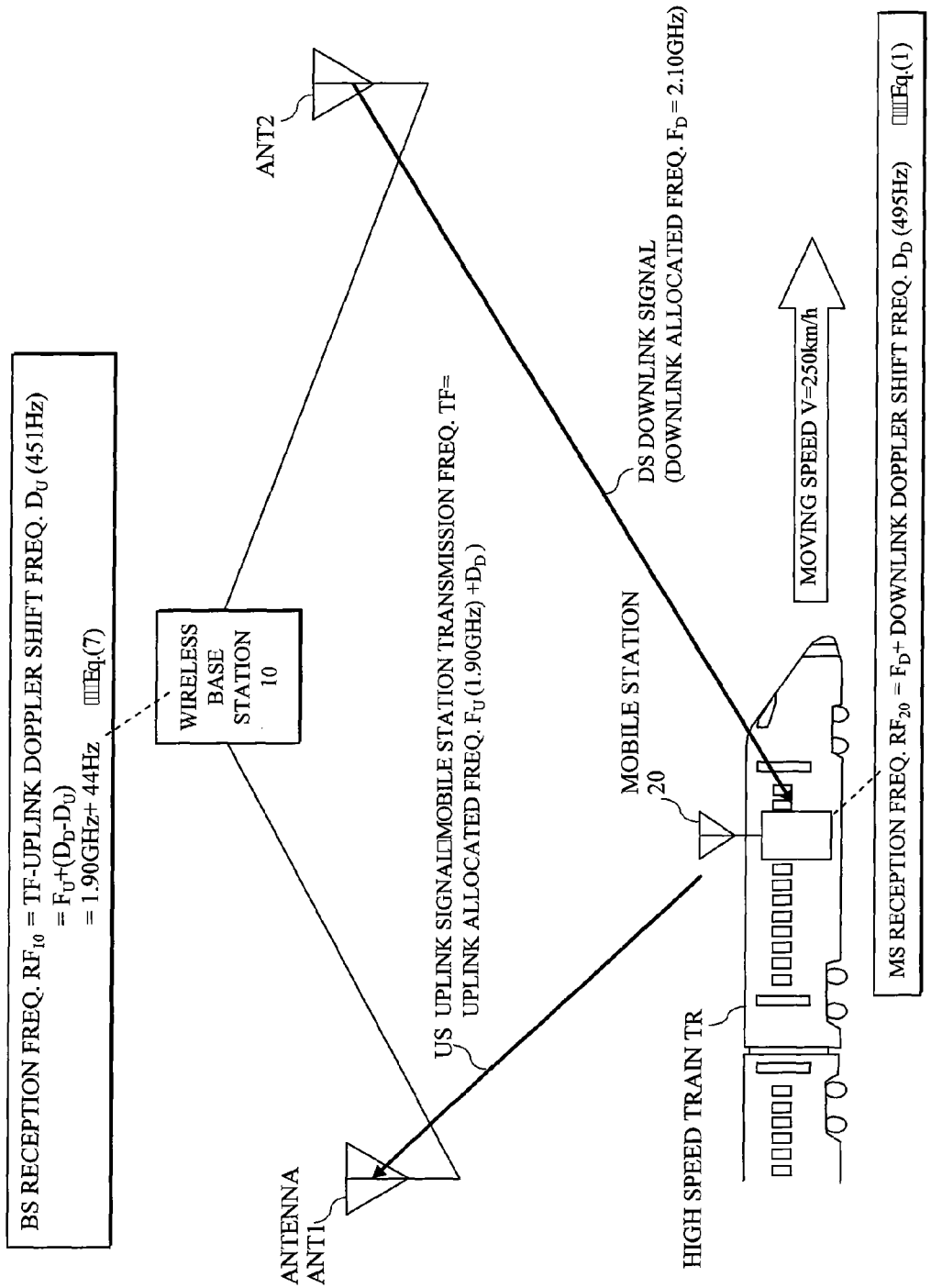
FIG. 5 is a diagram depicting a mobile station transmission frequency and a base station reception frequency in an embodiment [1] of a wireless base station and a control method thereof.

As depicted in FIG. 5, supposing that a user (not depicted) holding the mobile station 20 boards a high speed train TR passing through the wireless base station 10 at the speed V="250 Km/h" as with FIG. 10, the reception frequency $RF_{20}$ of the mobile station 20 has the same value as the above Eq. (1).

Accordingly, like the above Eq. (3), the uplink signal US is transmitted from the mobile station 20 at the transmission frequency TF added with the downlink Doppler shift frequency $D_D$ (495 Hz), where the mobile station 20 moves away from the antenna ANT1, so that the reception frequency $RF_{10}$ of the wireless base station 10 assumes to be a value given by the following Eq. (7) under the influence of a negative Doppler shift:

$$BS \text{ reception } freq. \; RF_{10} = MS \text{ transmission } freq. \; TF \quad \text{Eq. (7)}$$
$$\text{uplink Doppler shift } freq.$$
$$D_U$$
$$= F_U + (D_D \quad D_U)$$
$$= 1.90 \text{ GHz} + 44 \text{ Hz}$$

Namely, the downlink Doppler shift frequency DD and the uplink Doppler shift frequency DU cancel with each other as expressed by the above Eq. (7), in which the frequency variation of the uplink signal US received by the wireless base station 10 is suppressed small.

Then, the processor 240 monitors whether or not the frequency variation range ΔF2 of the antenna ANT2 has transitioned from "section A" to "section B" (step S7).

Figure 6A:
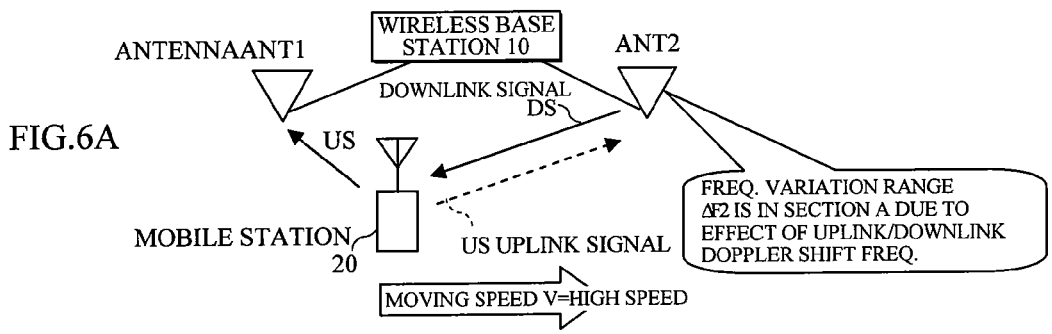
FIGS. 6A-6C are diagrams depicting another example of a moving process of a mobile station used in an operation of an embodiment [1] of a wireless base station and a control method thereof.

As depicted in FIG. 6A, immediately after the execution of the above step S6, the downlink signal DS transmitted from the antenna ANT2 is influenced by a positive Doppler shift and the uplink signal US transmitted from the mobile station 20 is also influenced by the positive Doppler shift, so that the frequency variation range ΔF2 resides in "section A".

Accordingly, the processor 240 executes no signal processing, where the transmission by the antenna ANT2 and the reception by the antenna ANT1 are maintained (step S8).

Figure 6B:
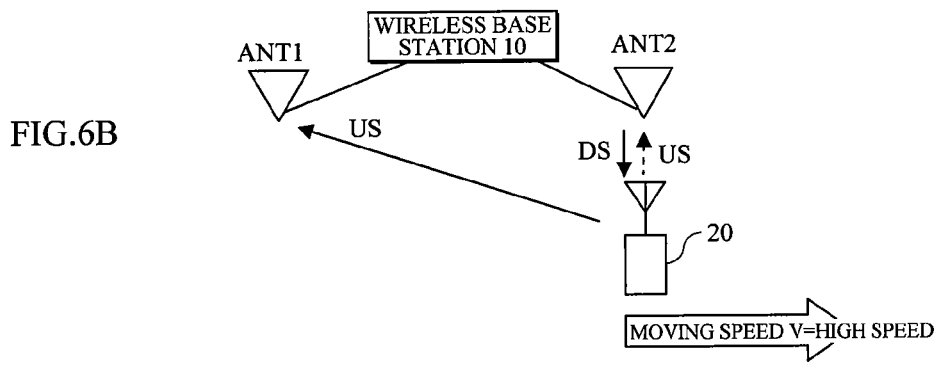

On the other hand, as depicted in FIG. 6B, when the mobile station 20 reaches a vicinity of the antenna ANT2, the frequency variation range ΔF2 of the antenna ANT2 transitions from "section A" to "section B".

In this case, the influence of the downlink Doppler shift is small and so weakens the cancellation with the uplink Doppler shift arising in the uplink signal US (the maximum point of the cancellation effect is a middle point between the antennas ANT1 and ANT2), so that the processor 240 provides to the multiplexer 220 the selection signal SL1 instructing to select the uplink signal US received from the antenna ANT2 (baseband portion 210_2), not from the antenna ANT1 (baseband portion 210_1) (step S9).

Figure 6C:
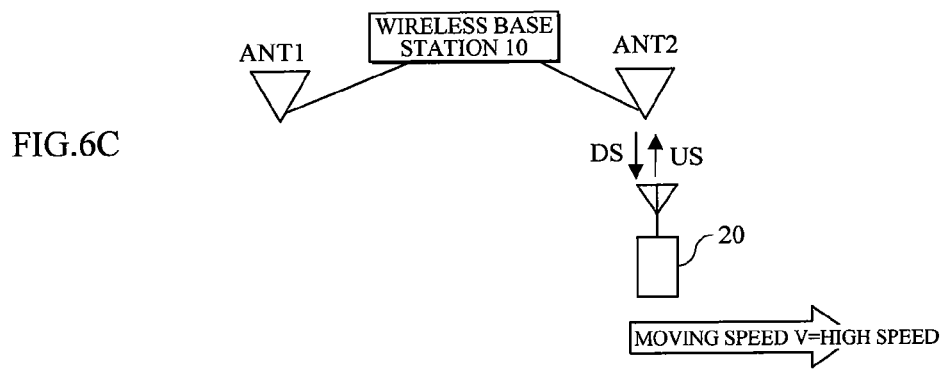

This enables, as depicted in FIG. 6C, the transmission/reception with the mobile station 20 to be performed by the antenna ANT2.

While this embodiment is arranged to equip a single wireless base station with two antennas, the same operation as the above can be achieved by a wireless base station system indicated in the following modification.

Figure 7:
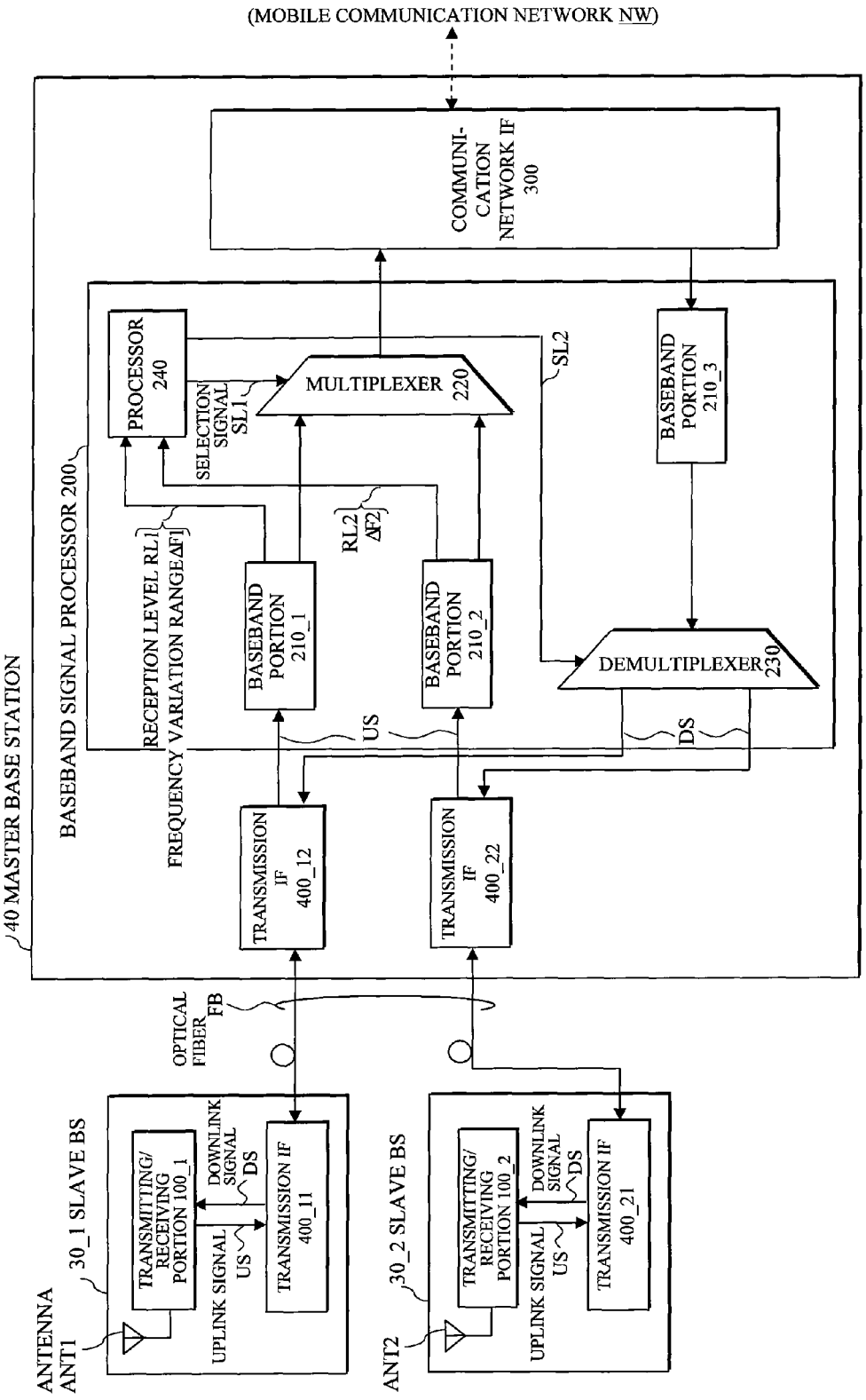
FIG. 7 is a block diagram depicting a modification of an embodiment [1] of a wireless base station and a control method thereof.

Modification: FIG. 7

A wireless base station system 1000 depicted in FIG. 7 is formed of a slave base station (antenna device) 30_1 having the antenna ANT1 and the transmitting/receiving portion 100_1 depicted in FIG. 1, a slave base station 30_2 having the antenna ANT2 and the transmitting/receiving portion 100_2, and a master base station 40 having the baseband signal processor 200 and a communication network interface 300.

The transmitting/receiving portion 100_1 within the slave base station 30_1 and the baseband signal processor 200 within the master base station 40 are mutually connected to transmit the downlink signal DS and receive the uplink signal US through transmission interfaces 400_11 and 400_12 mutually connected with an optical fiber FB. Similarly, the transmitting/receiving portion 100_2 within the slave base station 30_2 and the baseband signal processor 200 within the master base station 40 are mutually connected to transmit/receive a signal through a transmission interface 400_21, the optical fiber FB and a transmission interface 400_22.

Figure 8:
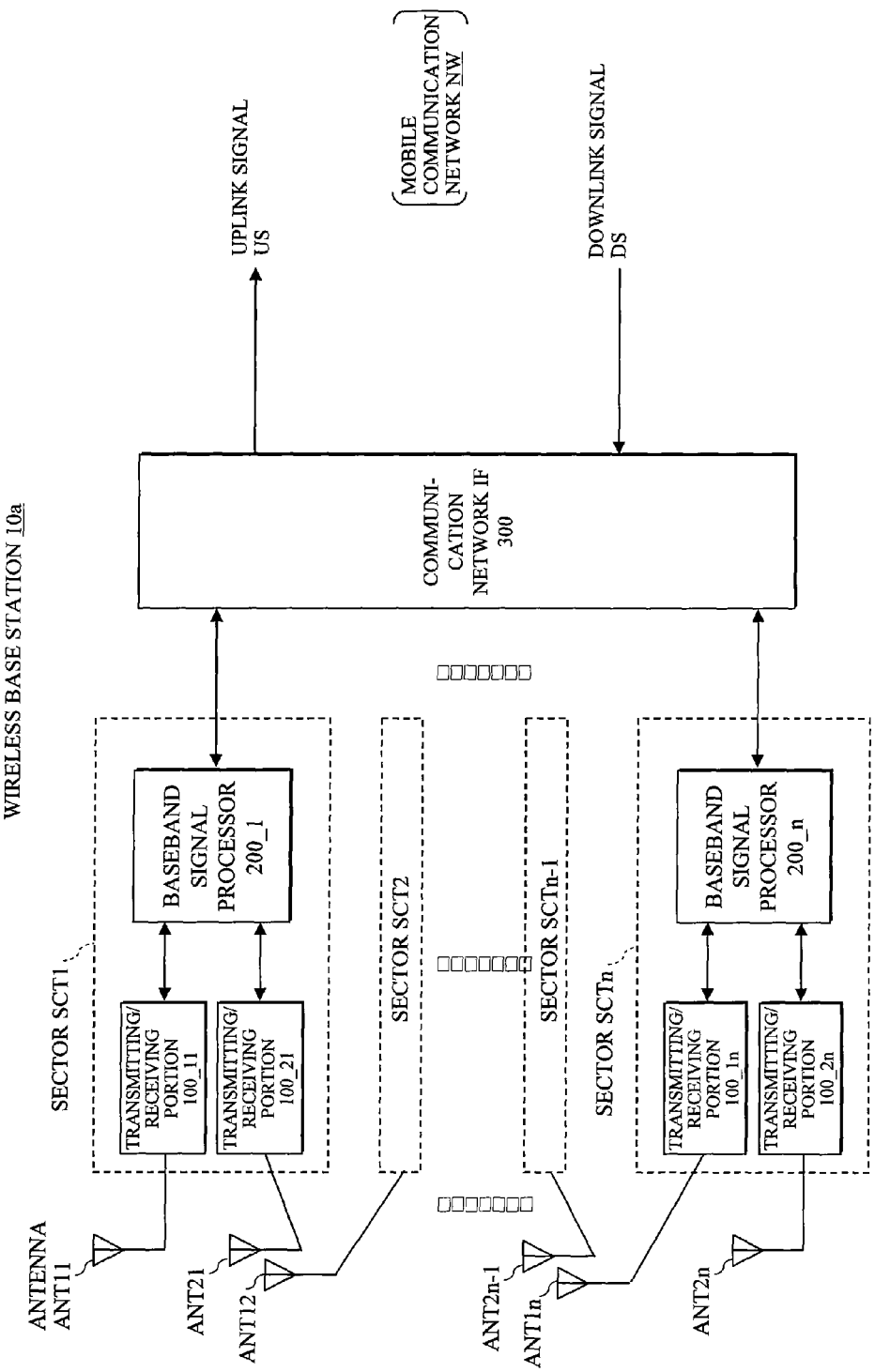
FIG. 8 is a block diagram depicting an arrangement of an embodiment [2] of a wireless base station and a control method thereof.

Embodiment [2]: FIGS. 8 and 9

A wireless base station 10a according to this embodiment depicted in FIG. 8 is a base station managing "n" number of sectors SCT1-SCTn, each of which is equipped with antennas, transmitting/receiving portions and a baseband signal processor in the same manner as the above embodiment [1].

Also, adjacent antennas on adjacent sectors are set close to each other like the antennas ANT21 and ANT12 depicted so that the frequency variations of the uplink signals received may be equivalent.

Now the operation of this embodiment will be described, in which the operation of each sector is omitted to be described because it is the same as the above embodiment [1] and only the operation upon switchover between the sectors will be described referring to FIG. 9.

Figure 9A:
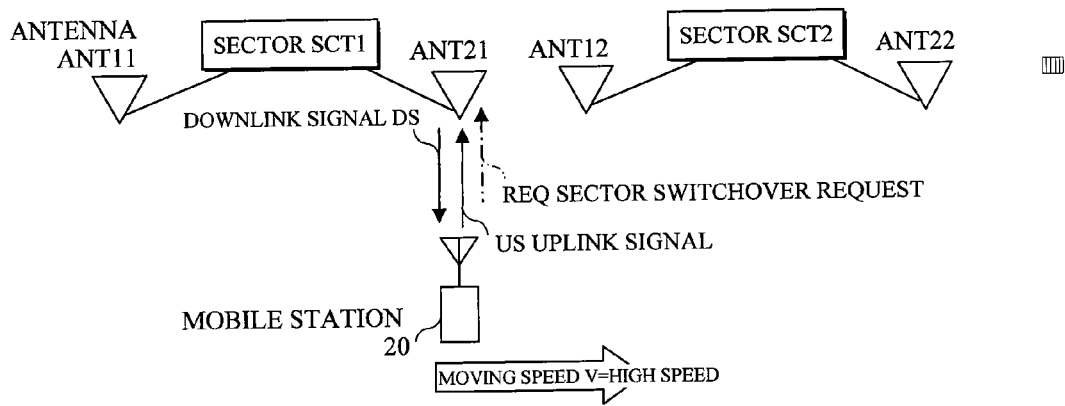
FIGS. 9A and 9B are diagrams depicting an operation example of an embodiment [2] of a wireless base station and a control method thereof.

As depicted in FIG. 9A, when the mobile station 20 moving at the speed V="high speed" reaches a vicinity of the antenna ANT21 within the sector SCT1, the baseband signal processor 200_1 provided corresponding to the sector SCT1 controls to perform the transmission/reception with the mobile station 20 by the antenna ANT21 in the same manner as the above embodiment [1], whereby the reception frequency variation range of the antenna ANT21 belongs to "section B" depicted in FIG. 4.

Approaching the antenna ANT12 of the sector SCT2 enables communications to be made with the sector SCT2, so that the mobile station 20 transmits to the sector SCT1 a switchover request REQ toward the sector SCT2 as depicted by dot and dash lines in FIG. 9A.

Figure 9B:
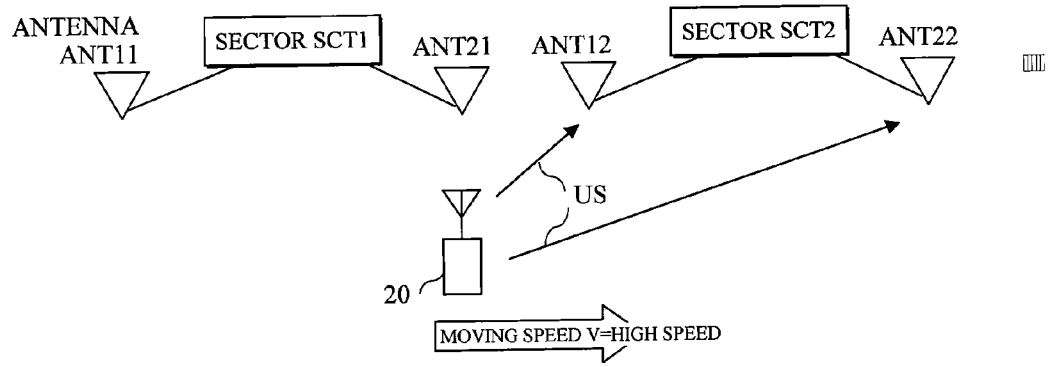

The reception frequency variation range of the antenna ANT21 now belongs to "section B", the sector switchover request REQ is normally processed (received) and as depicted in FIG. 9B the measurements of the reception level and the frequency variation range described in the above embodiment [1] with respect to the antennas ANT12 and ANT22 within the sector SCT2 are to be performed.

At this time, the moving speed V of the mobile station 20 is "high speed", where the reception frequency variation range of the antenna ANT12 belongs to "section B" in the same manner as the antenna ANT21 within the sector SCT1, so that the communication will begin from a state where the frequency variation of the uplink signal US in the sector SCT2 is small.

Also in the following sectors SCT3, SCT4, . . . , SCTn, such a switchover between sectors is to be performed as with the above.

It is to be noted that a wireless base station system, not depicted, equipped with a plurality of the wireless base stations 10 depicted in FIG. 1 and with the adjacent antennas on adjacent base stations set close to each other can also achieve the above operation for switchover between base stations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A wireless base station comprising:
a plurality of antennas; and
a signal processor to take in reception signals from a mobile station to perform a signal transmission and reception with the mobile station by a first antenna providing a higher reception signal level, in which the signal processor switches over the signal transmission to the mobile station by the first antenna to that by a second antenna while keeping the signal reception from the mobile station by the first antenna, when a frequency variation characteristic measured for an allocated frequency of the reception signal from the first antenna indicates that the mobile station is moving away from the first antenna.

2. The wireless base station as claimed in claim 1, wherein the signal processor determines that the mobile station is moving away from the first antenna when the frequency variation characteristic presents a negative characteristic and a variation range of the frequency variation characteristic exceeds a specified value.

3. The wireless base station as claimed in claim 1, wherein after having switched over the signal transmission to the mobile station by the first antenna to that by the second antenna, when a variation range of the frequency variation characteristic measured with the second antenna falls below a specified value, the signal processor determines that the mobile station has moved within a fixed distance area of the second antenna, thereby switching over the signal reception from the mobile station by the first antenna to that by the second antenna as well.

4. The wireless base station as claimed in claim 1, wherein the antennas and the signal processor are provided for each sector managed by the wireless base station, in which the adjacent antennas on adjacent sectors are set close to each other to present equivalent frequency variation characteristics.

5. A wireless base station system comprising:
a plurality of slave base stations; and
a master base station to take in reception signals of the slave base stations from a mobile station to select a first slave base station providing a higher reception signal level to perform a signal transmission and reception with the mobile station, in which the master base station selects a second slave base station to perform a signal transmission to the mobile station while keeping the signal reception from the mobile station by the first slave base station, when a frequency variation characteristic measured for an allocated frequency of the reception signal for the first slave base station indicates that the mobile station is moving away from the first slave base station.

6. A wireless base station system comprising:
a plurality of wireless base stations, each of which including:
a plurality of antennas; and
a signal processor to take in reception signals from a mobile station to perform a signal transmission and reception with the mobile station by a first antenna providing a higher reception signal level, in which the signal processor switches over the signal transmission to the mobile station by the first antenna to that by a second antenna when a frequency variation characteristic measured for an allocated frequency of the reception signal from the first antenna indicates that the mobile station is moving away from the first antenna; and after the signal transmission to the mobile station by the first antenna has been switched over to that by the second antenna, when a variation range of the frequency variation characteristic measured with the second antenna falls below a specified value, the signal processor determines that the mobile station has moved within a fixed distance area of the second antenna, thereby switching over the signal reception from the mobile station by the first antenna to that by the second antenna as well while keeping the signal reception from the mobile station by the first antenna;
the adjacent antennas on adjacent wireless base stations being set close to each other to present equivalent frequency variation characteristics.

7. A control method of a wireless base station including a plurality of antennas, the control method comprising:
  taking in reception signals from a mobile station to perform a signal transmission and reception with the mobile station by a first antenna providing a higher reception signal level;
  measuring, during the signal transmission and reception, a frequency variation characteristic for an allocated frequency of the reception signal from the first antenna; and
  switching over the signal transmission to the mobile station by the first antenna to that by a second antenna while keeping the signal reception from the mobile station by the first antenna, when the frequency variation characteristic indicates that the mobile station is moving away from the first antenna.

* * * * *